Patented Dec. 16, 1941

2,266,141

UNITED STATES PATENT OFFICE 2,266,141

POLYALKOXYALKANOL ESTERS

Frederic Henry Adams, Somerville, N. J., assignor to American Cyanamid Company, New York, N. Y., a corporation of Maine No Drawing. Application July 10, 1940,
Serial No. 344,667

12 Claims. (Cl. 260—456)

This invention relates to processes of making aryl sulfonic acid esters of polyalkoxyalkanols, and to certain of the esters as new compounds.

The esters of the present invention may be represented by the following formula:

$$ArSO_2O(CH_2CH_2O)_mR$$

in which Ar is an aryl radical, and R is an alkyl radical, and $m$ is an integer greater than one.

According to the process of the present invention the esters are obtained by reacting an arylsulfone halide and preferably an arylsulfone chloride on the corresponding polyalkyleneglycol ether. The method is generally applicable to any of these ethers as I have found that they all react with the arylsulfone halides to give the esters in good yield.

The esters produced according to the present invention have a number of uses more particularly as intermediates for the production of amines, N-substituted by polyalkyleneglycol ether radicals, such as for example those described in my copending application Serial No. 344,669 filed July 10, 1940. Since for this particular use the aryl sulfone portion of the molecule is split off, the particular aryl radical is not of the greatest importance, hence I prefer to use the cheaper arylsulfone chlorides such as p-toluene sulfone chloride, benzene sulfone chloride or beta-naphthalene sulfone chloride, although the invention is not limited to the use of these three reagents.

Typical examples of polyalkyleneglycol ethers which may be reacted with the sulfone chlorides to produce the esters of the present invention are 3(ethoxyethoxy)-propanol

$C_2H_5OCH_2CH_2OCH_2CH_2CH_2OH$

4(ethoxyethoxy)-butanol $C_2H_5OCH_2CH_2OCH_2CH_2CH_2CH_2OH$ the methyl and ethyl ethers of triethylene glycol for example $CH_3OCH_2CH_2OCH_2CH_2OCH_2CH_2OH$ the methyl and ethyl ethers of tetraethylene glycol, for example, $C_2H_5(OCH_2CH_2)_3OC_2H_4OH$ and the like.

The reaction proceeds smoothly but as hydrochloric acid is given off it is preferable to carry out the reaction in the presence of an acid binding agent for which caustic alkalies, pyridine, and the like may be used. The esters, however, can be produced without an acid binding agent by heating, although the yield is not quite as high and therefore while not wishing to limit the present case to the use of acid binding agents, their use constitutes a preferred embodiment.

The esters are in general heavy, somewhat viscous, colorless oils, insoluble in water but soluble in the usual organic solvents. The method of preparing these compounds is illustrated in the following examples which describe the production of typical members, but it should be understood that the invention is not intended to be limited to the details therein set forth. The parts are by weight.

Example 1

82 parts of triethyleneglycol monomethyl ether and 100 parts of p-toluene sulfonchloride are mixed in a vessel surrounded by an ice bath. To this mixture is added with stirring 56 parts of 50% sodium hydroxide solution at such a rate that the temperature is maintained at approximately 30° C. After all the caustic has been added stirring is continued for half an hour, then 250 parts of water are added and the mixture is stirred for about 15 minutes more. The heavy oil is then separated and the aqueous layer is extracted with 50 parts of benzene. The benzene extract is then added to the oil and 50 more parts of benzene are added to this mixture. The mixture is dried by the addition of 10 parts of anhydrous sodium sulfate and then the benzene is distilled off in a vacuum. The remaining colorless oil is the p-toluene sulfonic acid ester of triethylene glycol monomethyl ether of the following formula:

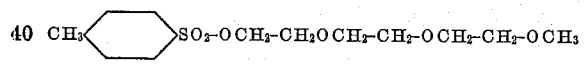

Example 2

104 parts of tetraethyleneglycol monomethyl ether and 100 parts of p-toluene sulfonchloride are mixed and reacted with sodium hydroxide solution as in the preceding example. The product is a colorless heavy viscous oil, insoluble in water but soluble in the usual organic solvents. It is the p-toluene sulfonic acid ester of tetraethyleneglycol monomethyl ether of the following formula:

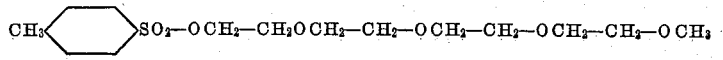

What I claim is:

1. A method of preparing aryl sulfonic esters of polyalkoxyalkanols which comprises reacting an aryl sulfone halide with a polyalkoxyalkanol of the formula:

$$R(OCH_2CH_2)_mOH$$

in which R stands for alkyl and $m$ is an integer greater than one.

2. A method of preparing aryl sulfonic esters of polyalkoxyalkanols which comprises reacting an arylsulfone halide with a polyalkoxyalkanol of the formula:

$$R(OCH_2CH_2)_mOH$$

in which R stands for alkyl and $m$ is an integer greater than one in the presence of an acid binding substance.

3. A method of producing an aryl sulfonic acid ester of alkoxyethoxyethoxy ethanol which comprises reacting an arylsulfone halide with an alkoxyethoxyethoxy ethanol of the formula:

$$ROCH_2CH_2 \cdot OCH_2CH_2 \cdot OCH_2CH_2OH$$

in which R is an alkyl group.

4. A method of producing an aryl sulfonic acid ester of alkoxyethoxyethoxy ethanol which comprises reacting an arylsulfone halide with an alkoxyethoxyethoxy ethanol of the formula:

$$ROCH_2CH_2 \cdot OCH_2CH_2 \cdot OCH_2CH_2OH$$

in which R is an alkyl group, in the presence of an acid binding substance.

5. A method of preparing p-toluene sulfonic acid esters of alkoxyethoxyethoxy ethanol which comprises reacting p-toluene sulfone chloride with an alkoxyethoxyethoxy ethanol of the formula:

$$ROCH_2CH_2 \cdot OCH_2CH_2 \cdot OCH_2CH_2OH$$

in which R is an alkyl radical in the presence of an acid binding agent.

6. A method of preparing the p-toluene sulfonic ester of methoxyethoxyethoxy ethanol which comprises reacting methoxyethoxyethoxy ethanol with p-toluene sulfone chloride in the presence of an acid binding substance.

7. A method of producing an aryl sulfonic acid ester of alkoxyethoxyethoxyethoxy ethanol which comprises reacting an arylsulfone halide with an alkoxyethoxyethoxyethoxy ethanol of the formula:

$$ROCH_2CH_2 \cdot OCH_2CH_2 \cdot OCH_2CH_2 \cdot OCH_2CH_2OH$$

in which R is an alkyl group.

8. A method of producing an aryl sulfonic acid ester of alkoxyethoxyethoxyethoxy ethanol which comprises reacting an arylsulfone halide with an alkoxyethoxyethoxyethoxy ethanol of the formula:

$$ROCH_2CH_2 \cdot OCH_2CH_2 \cdot OCH_2CH_2 \cdot OCH_2CH_2OH$$

in which R is an alkyl group, in the presence of an acid binding substance.

9. A method of preparing p-toluene sulfonic acid esters of alkoxyethoxyethoxyethoxy ethanol which comprises reacting p-toluene sulfone chloride with an alkoxyethoxyethoxyethoxy ethanol of the formula:

$$ROCH_2CH_2 \cdot OCH_2CH_2 \cdot OCH_2CH_2 \cdot OCH_2CH_2OH$$

in which R is an alkyl radical in the presence of an acid binding agent.

10. A method of preparing the p-toluene sulfonic ester of methoxyethoxyethoxyethoxy ethanol which comprises reacting methoxyethoxyethoxyethoxy ethanol with p-toluene sulfone chloride in the presence of an acid binding substance.

11. As a new compound the p-toluene sulfonic ester of triethylene glycol monomethyl ether having the following formula:

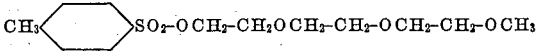

12. As a new compound the p-toluene sulfonic ester of tetraethylene glycol monomethyl ether having the following formula:

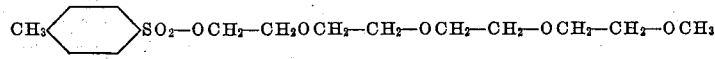

FREDERIC HENRY ADAMS.